(12) United States Patent
Fuma et al.

(10) Patent No.: US 6,510,490 B2
(45) Date of Patent: Jan. 21, 2003

(54) WRITE CACHE CIRCUIT, RECORDING APPARATUS WITH WRITE CACHE CIRCUIT, AND WRITE CACHE METHOD

(75) Inventors: Masato Fuma, Ichinomiya (JP); Miyuki Okamoto, Hashima (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 22 days.

(21) Appl. No.: 09/805,940

(22) Filed: Mar. 15, 2001

(65) Prior Publication Data

US 2001/0025334 A1 Sep. 27, 2001

(30) Foreign Application Priority Data

Mar. 17, 2000 (JP) ........................................ 2000-076233

(51) Int. Cl.[7] ............................................... G06F 12/08
(52) U.S. Cl. ............................. 711/113; 711/129; 714/6
(58) Field of Search ............................... 711/113, 129, 711/153, 173; 714/6

(56) References Cited

U.S. PATENT DOCUMENTS

| | | | | |
|---|---|---|---|---|
| 5,537,567 A | * | 7/1996 | Galbraith et al. | 711/114 |
| 5,574,708 A | * | 11/1996 | Kawakami | 369/53.36 |
| 5,651,132 A | * | 7/1997 | Honda et al. | 708/531 |
| 5,905,854 A | * | 5/1999 | Nielson et al. | 714/6 |
| 5,996,046 A | * | 11/1999 | Yagisawa et al. | 711/112 |
| 6,021,463 A | * | 2/2000 | Belser | 707/204 |
| 6,148,366 A | * | 11/2000 | Watanabe | 710/57 |
| 6,357,030 B1 | * | 3/2002 | Demura et al. | 714/755 |
| 6,388,919 B2 | * | 5/2002 | Terasaki | 365/185.09 |
| 2001/0012222 A1 | * | 8/2001 | Terasaki | 365/200 |
| 2002/0101440 A1 | * | 8/2002 | Niikawa et al. | 345/698 |

FOREIGN PATENT DOCUMENTS

| | | |
|---|---|---|
| JP | 5-41037 | 2/1993 |
| JP | 7-336639 | 12/1995 |
| JP | 11-306674 | 11/1999 |
| JP | 11-317008 | 11/1999 |

* cited by examiner

Primary Examiner—Hiep T. Nguyen
(74) Attorney, Agent, or Firm—Armstrong, Westerman & Hattori, LLP

(57) ABSTRACT

User data transmitted from the host side is first stored in write cache regions of an SDRAM 12 on the basis of an error correction process. When executing an ECC•EDC encode process of adding redundancy data such as an error correction code to the stored user data on the basis of the error correction processing, an encode region of SDRAM 12 is used. The data subjected to the ECC•EDC encode process is sequentially read out from encode region to be modulated and then written onto a disk.

15 Claims, 13 Drawing Sheets

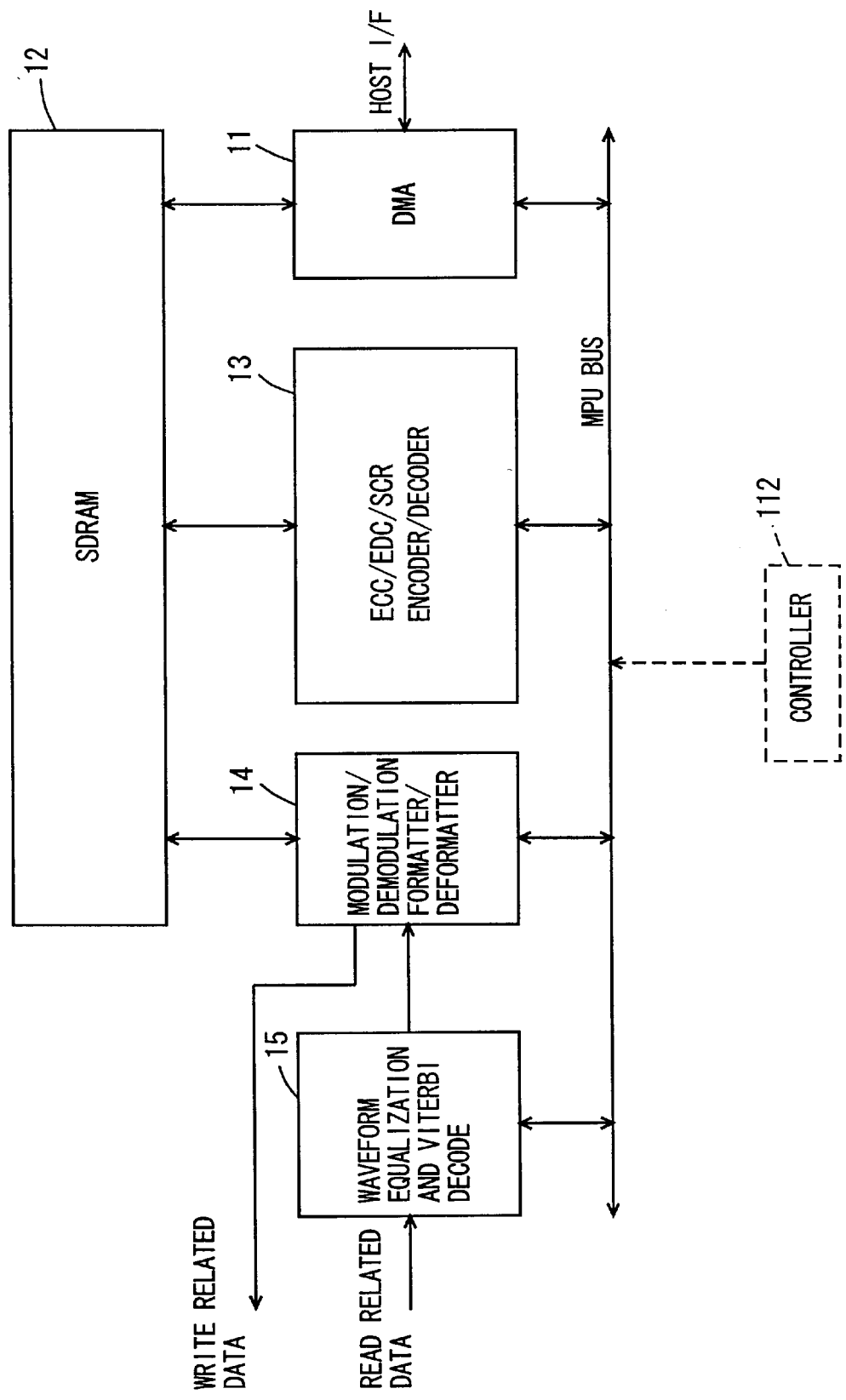
F I G. 5

F I G. 7
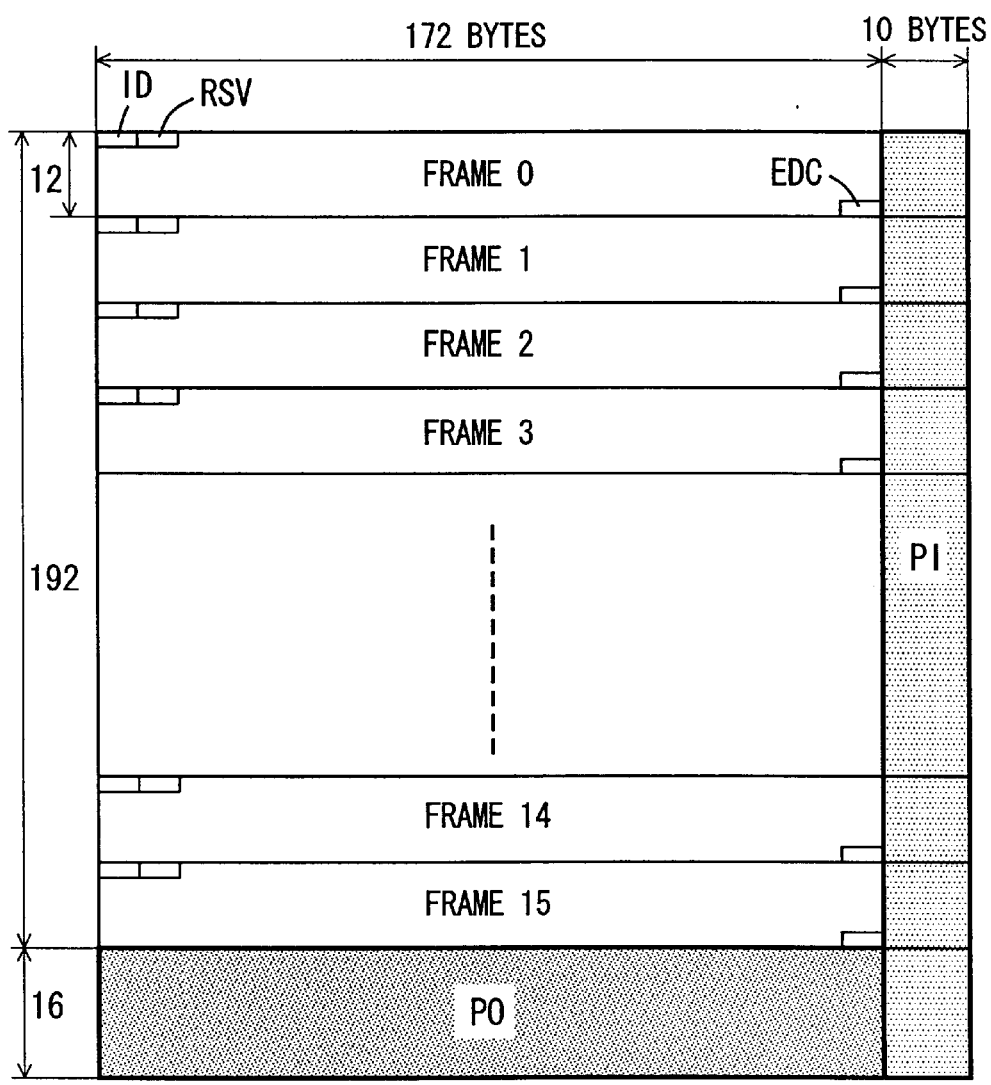

FIG.13

| 0 | 1 | 2 | 3 | FRAME 0 |
|---|---|---|---|---|
| 4 | 5 | 6 | 7 | FRAME 1 |
| | | | | |
| | | | | |
| | | | | |
| | | | | |
| | | | | |
| | | | | |
| | | | | |
| | | | | |
| | | | | |
| | | | | |
| | | | | |
| | | | | |
| 60 | 61 | 62 | 63 | FRAME 15 |

WRITE CACHE CIRCUIT, RECORDING APPARATUS WITH WRITE CACHE CIRCUIT, AND WRITE CACHE METHOD

BACKGROUND OF THE INVENTION

1. Field of the Invention

The present invention relates to a write cache circuit, a recording apparatus with a write cache circuit, and a write cache method. More particularly, the present invention relates to a write cache circuit directed to improve the usage efficiency of the memory in the process of adding redundancy data for an error correction process to data transferred from a host, a recording apparatus including such a write cache circuit, and a write cache method.

2. Description of the Background Art

The conventional recording and reproduction apparatus adapted for a magneto-optical disk which is an example of a recording medium is known. The write system of such a recording and reproduction apparatus first caches (stores) the user data transferred from the host in a memory, and applies an encode process of adding a correction code and an error detection code (redundancy data), followed by recording onto a magneto-optical disk.

At the read system of this recording and reproduction apparatus, the data read out from a recording medium is subjected to an error correction process and an error detection process using the redundancy data added at the write system, and then transferred to the host side. Thus, data recorded at a recording medium is reproduced at high accuracy.

In the conventional recording and reproduction apparatus of a magneto-optical disk, data is arranged on the memory while reserving in advance a region where redundancy data is to be added for each user data in the error correction processing unit in the caching process.

However, there was a problem that the memory usage efficiency is degraded if data is arranged according to the address adaptive to the processing format.

SUMMARY OF THE INVENTION

Therefore, the object of the present invention is to provide a write cache circuit of high memory usage efficiency, a recording apparatus including such a write cache circuit, and a write cache method.

According to an aspect of the present invention, a write cache circuit is employed in a recording apparatus that records data transferred from a host on a recording medium with redundancy data for an error correction process added. The write cache circuit includes a random access memory having a host write region and an encode work region, a write circuit writing data transferred from the host into the host write region on the basis of an error correction block, a circuit transferring the data on the basis of the error correction block written in the host write region into the encode work region, and reading out data from the encode work region for a process of adding the redundancy data, or writing data obtained as a result of a process of adding redundancy data back into the encode work region, and a read circuit reading out data already added with the redundancy data from the data in the encode work region for recording on a recording medium.

Preferably, the host write region includes a plurality of write regions. Each of the plurality of write regions has a minimum size required to store the data on the basis of the error correction block.

Preferably, the encode work region includes two encode regions. Each of the two encode regions has a minimum size required to store the data on the basis of the error correction block and the corresponding redundancy data. The data of one of the two encode regions becomes a subject of the process adding redundancy data, and data of the other of the two encode regions is read out by the read circuit for recording on the recording medium.

More preferably, in the process of adding redundancy data, the data on the basis of the error correction block is added with error correction codes in a horizontal direction and a vertical direction for an error correction process by a product code.

According to another aspect of the present invention, a recording apparatus recording data transferred from a host on a recording medium with redundancy data for an error correction process added, includes an encoder adding the redundancy data, a write cache circuit, and a record processing circuit to modulate data added with the redundancy data for recording on the recording medium. The write cache circuit includes a random access memory having a host write region and an encode work region, a write circuit writing data transferred from the host into the host write region on the basis of an error correction block, a circuit transferring the data on the basis of the error correction block written in the host write region to the encode work region, and providing data from the encode work region to the encoder, or writing data received from the encoder back into the encode work region, and a read circuit reading out data already added with the redundancy data from the data in the encode work region and providing the read data to the record processing circuit.

Preferably, the host write region includes a plurality of write regions. Each of the plurality of write regions has a minimum size required to store the data on the basis of the error correction block.

Preferably, the encode work region includes two encode regions. Each of the two encode regions has a minimum size required to store the data on the basis of the error correction block and the corresponding redundancy data. Data of one of the two encode regions becomes a subject of a process by the encoder, and data of the other of the two encode regions becomes a subject of process by the record processing circuit.

More preferably, in the process of adding redundancy data, the data on the basis of the error correction block is added with error correction codes in a horizontal direction and a vertical direction for an error correction process by a product code.

According to a further aspect of the present invention, a write cache method in a recording apparatus including a random access memory having a host write region and an encode work region, and recording data transferred from a host on a recording medium with redundancy data for an error correction process added, includes the steps of writing data transferred from the host into the host write region on the basis of an error correction block, transferring the data on the basis of the error correction block written in the host write region to the encode work region, and reading out data from the encode work region for a process of adding the redundancy data, or writing data obtained as a result of the process of adding redundancy data back into the encode work region, and reading out data already added with redundancy data from the data in the encode work region for recording on the recording medium.

Preferably, the host write region includes a plurality of write regions. Each of the plurality of write regions has a minimum size required to store the data on the basis of the error correction block.

Preferably, the encode work region includes two encode regions. Each of the two encode regions has a minimum size required to store the data on the basis of the error correction block and the corresponding redundancy data. Data of one of the two encode regions becomes a subject of the process of adding redundancy data, and data of the other of the two encode regions is read out for recording on the recording medium.

Further preferably, in the process of adding redundancy data, data on the basis of the error correction block is added with error correction codes in a horizontal direction and a vertical direction for an error correction process by a product code.

According to the present invention, an encode region required for encoding and a write cache region required for caching are provided separately on a memory. Data can be read from the write cache region into the encode region for execution of a process in the ECC and EDC encode processes. Accordingly, the encode region is reduced significantly than that of a conventional case. The memory usage efficiency can be improved. The write cache efficiency can be improved even if the memory space is the same. Since it is not necessary to directly place the data transferred from the host at an address corresponding to a physical address, the degree of freedom of data reallocation on the write cache can be improved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a schematic block diagram of the portion related to error correction and modulation/demodulation realized with an LSI in the recording and reproduction apparatus of FIG. 4.

FIG. 7 shows the data structure of the ECC layout block of one unit stored in the SDRAM of FIG. 6.

FIG. 13 shows the relationship between memory mapping of an embodiment of the present invention and a page.

DESCRIPTION OF THE PREFERRED EMBODIMENTS

Figure 1:
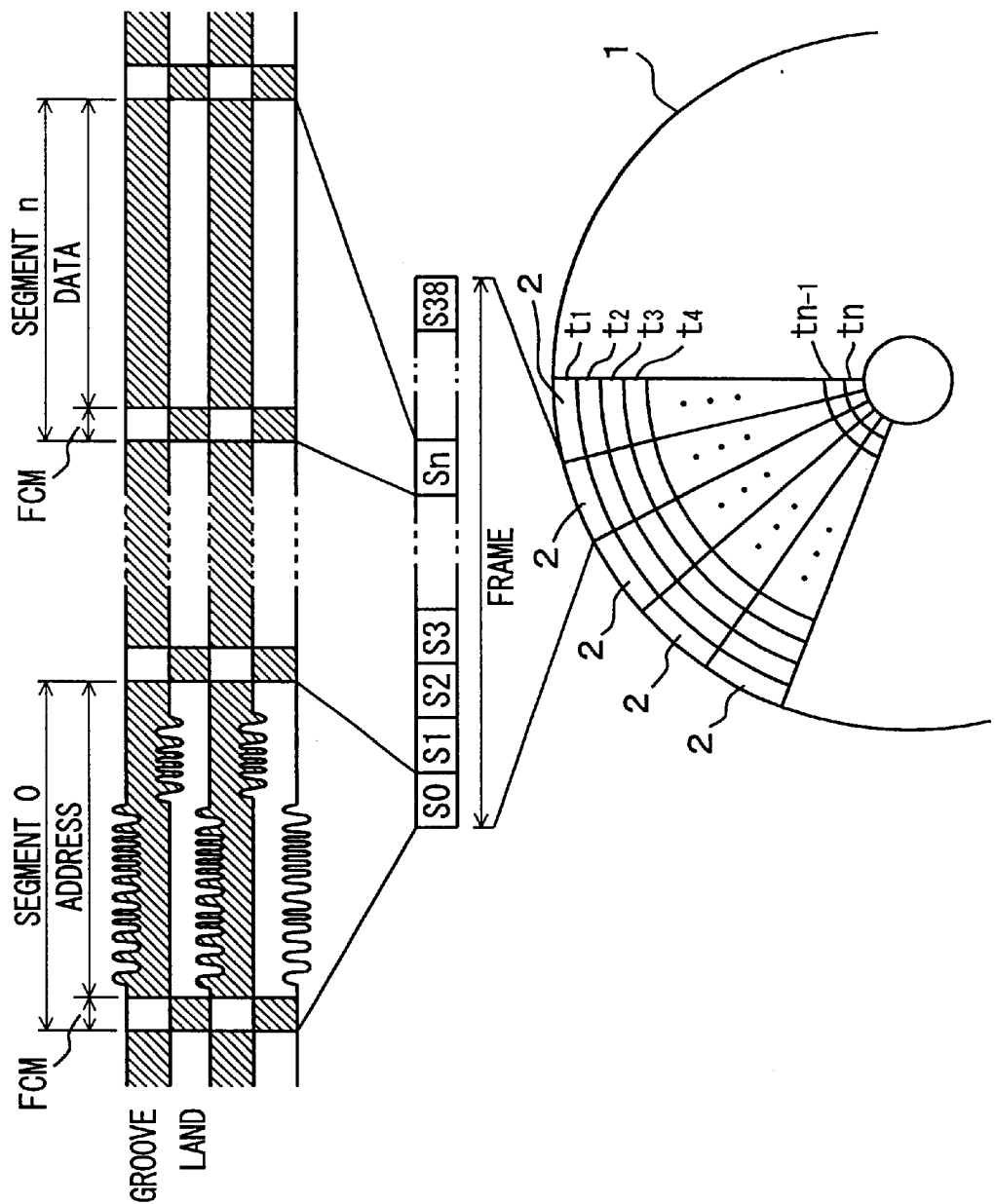
FIG. 1 schematically shows the relationship between the signal recording format on a magneto-optical disk and the signal format.

Embodiments of the present invention will be described in detail hereinafter with reference to the drawings. In the drawings, the same or corresponding components have the same reference characters allotted, and description thereof will not be repeated.

The format of information recorded and reproduced onto/from a magneto-optical disk which is a recording medium to which the present invention is applied will be described first.

Referring to FIG. 1, a plurality of tracks ($t_1, t_2, t_3, t_4, \ldots, t_{n-1}, t_n$) are formed concentrically (or spirally) on a recording plane of a magneto-optical disk 1. In FIG. 1, only a portion of the tracks formed all over the disk is shown in a sector manner. These plurality of concentric tracks form a band for every several adjacent tracks in the radial direction from the outer to inner circumference (for example, tracks $t_1$–$t_4$ form one band in FIG. 1). A buffer region not shown is formed between adjacent bands.

Each track on the magneto-optical disk is divided equally. A plurality of frames 2 each of which is the information recording unit are arranged in respective divided tracks.

As shown in FIG. 1, each frame 2 is formed of 39 segments (S0, S1, S2, S3, . . . , Sn, . . . , S38). The head segment S0 of the 39 segments is the address segment. The remaining 38 segments S1-S38 are data segments.

At the head position of each of the address segment and data segments is formed a fine clock mark (FCM) serving as a phase reference to generate a clock signal which becomes the reference of the recording and reproduction operation.

Referring to FIG. 1, address segment S0 and data segment Sn are shown schematically in a physical form. Each track is formed of a pair of land and groove. The hatched groove corresponds to the groove region formed on the recording plane and the land corresponds to the remaining portion.

In each of the address segment and data segments, the FCM is preformatted at the head position of each segment with opposite relief and projecting relationship between the groove and land. A region with such an FCM formed is referred to as "FCM field".

In the address field succeeding the FCM field in address segment S0, address information is preformatted by having the boarder line between the groove and the land wobbled by a signal which is a modulated version of the address signal related to the relevant frame at the time of fabrication of the magneto-optical disk.

A data field to record data magneto-optically is provided succeeding the FCM field in data segment Sn. Data can be recorded magneto-optically in either or both of the groove and land forming the track.

The format of a frame as the information recording unit will be described in further detail with reference to FIGS. 2A–2D.

Figure 2:
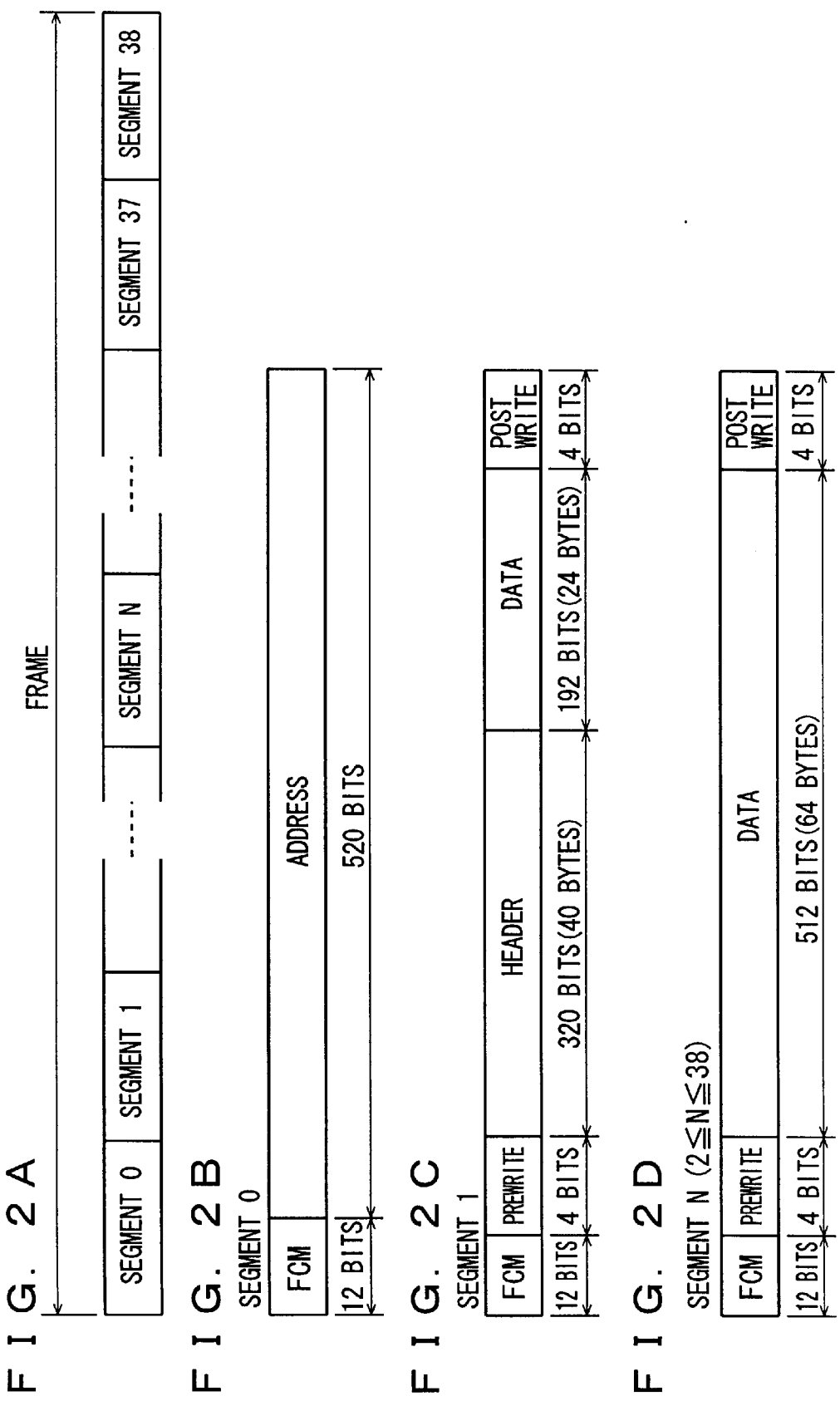
FIGS. 2A–2D show in detail the format of one frame of recording data.

As mentioned above, each frame is formed of the total of 39 segments, for example, segment 0 to segment 38 (FIG. 2A). Each segment is, for example, 532 bits in length. Therefore, a FCM is repeated at the cycle of 532 bits.

As shown in FIG. 2B, the head segment 0 of the 39 segments is the address segment. This address segment includes a 12-bit length FCM field with an FCM preformatted, and a 520-bit length address field with address data preformatted.

As shown in FIG. 2C, the second segment 1 of the 39 segments corresponds to the first data segment. This first data segment 1 includes a 12-bit length FCM field, a prewrite field where a fixed pattern "0011" of a 4-bit length indicating the start of data writing is recorded, a header field having a fixed pattern of a 320-bit (40 bytes) length used to recognize the recording start position of the frame unit in reproducing, a 192-bit (24 bytes) length data field to record data, and a post write field where a fixed pattern "1100" of a 4-bit length indicating the end of the data field is recorded.

As shown in FIG. 2D, the remaining segment 2 to segment 38 are all data segments of the same format. Each of these data segments includes a 12-bit length FCM field, a 4-bit length prewrite field, a 512-bit (64 bytes) length data field, and a 4-bit long post write field.

As apparent from FIGS. 2C and 2D, only the first data segment 1 of the data segments includes a header field.

The format of an ECC (Error Correction Code) layout block as the error correction data unit will be described hereinafter with reference to FIGS. 3A–3F.

Figure 3:
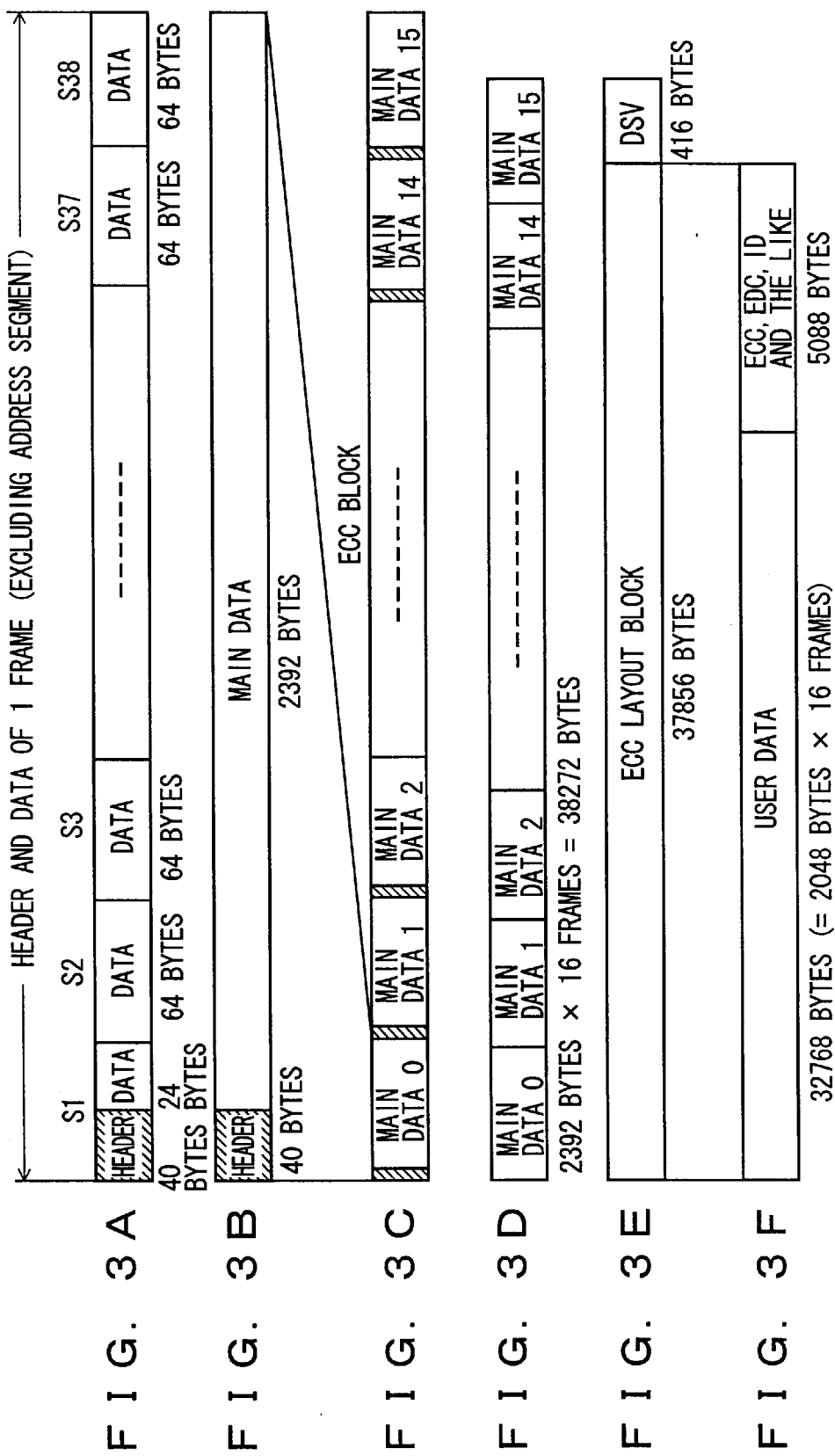
FIGS. 3A–3F show the formation process of data of an ECC layout block.

Regarding one frame formed of 39 segments shown in FIG. 2A, a data block including a header field of 40 bytes in length, and a data field (main data field) of 24 bytes+64 bytes×37=2392 bytes in length is formed from the fields of the header and data of the remaining 38 data segments S1–S38 excluding address segment S0, as shown in FIG. 3A.

Referring to FIG. 3C, a group of the data blocks of FIG. 3B corresponding to 16 frames constitutes a block referred to as an ECC block according to the magneto-optical recording standard.

In practice, the error correction process (referred to as ECC process hereinafter) dose not apply to the entire ECC block shown in FIG. 3C. More specifically, main data (2392 bytes each) of 16 frames excluding the header constitutes a block (2392 bytes×16=38272 bytes) as shown in FIG. 3D. Excluding the DSV (Digital Sum Variation) of 416 bytes therefrom, the remaining data of 37856 bytes in length is the error correction block for the actual ECC process, as shown in FIG. 3E. This blocks is referred to as "ECC layout block" hereinafter.

As shown in FIG. 3F, the data of the ECC layout block can be divided into the original user data (2048 bytes×16 frames=32768 bytes), and redundancy data (5088 bytes) such as the ECC, EDC (Error Detection Code) and ID.

Figure 4:
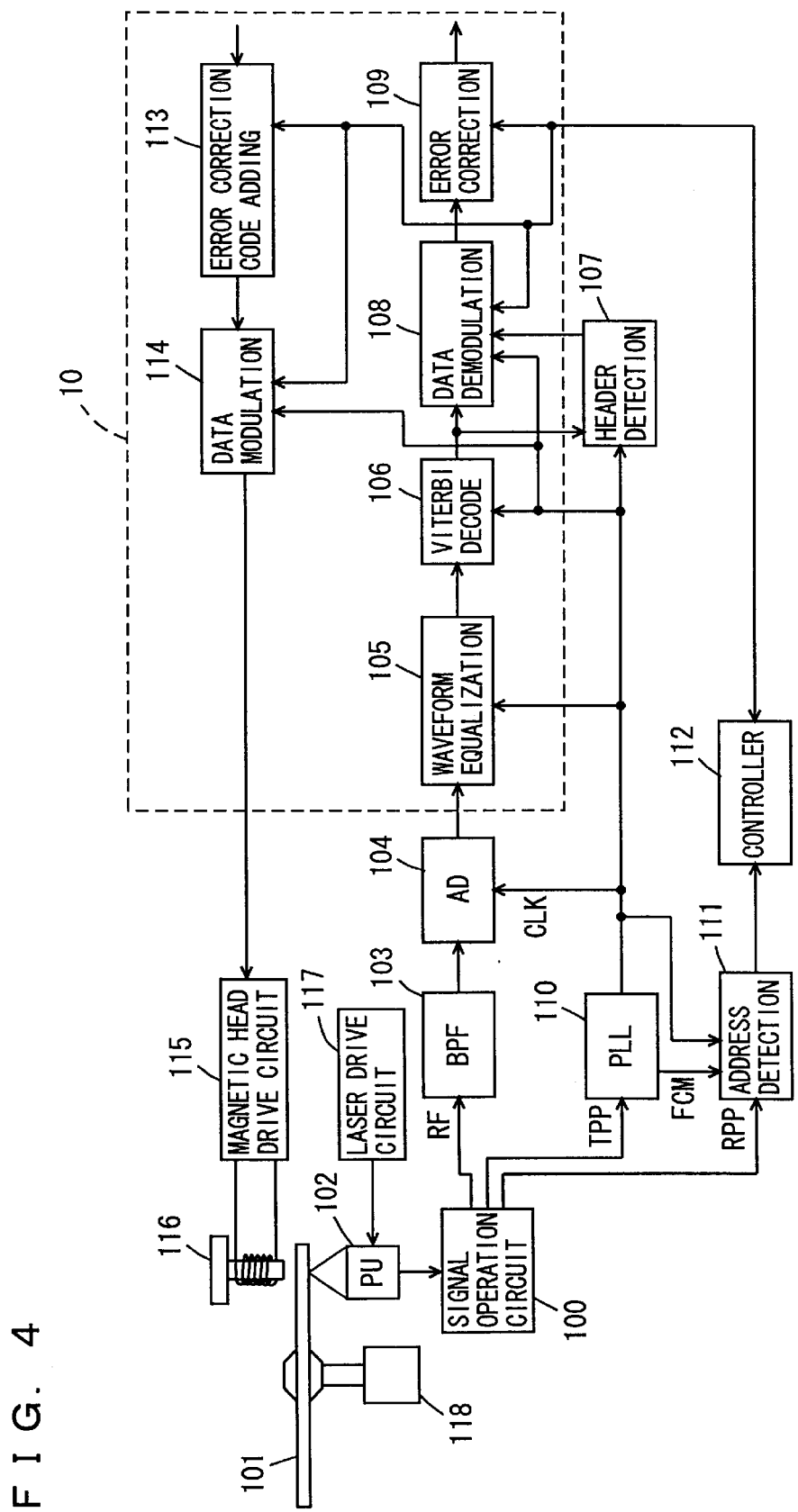
FIG. 4 is a schematic block diagram of a magneto-optical recording and reproduction apparatus according to an embodiment of the present invention.

FIG. 4 is a functional block diagram showing a structure of a recording and reproduction apparatus of a magneto-optical disk to which the present invention is applied.

Referring to FIG. 4, the recording operation of the recording and reproduction apparatus will be first described. Data to be recorded is applied to an error correction code addition circuit 113. The data is scrambled and added with redundancy data such as an error correction code (ECC data). The data added with the error correction code is digital modulated by a data modulator 114 and applied to a magnetic head drive circuit 115. Magnetic head drive circuit 115 drives a magnetic head 116 according to the input data. Magnetic head 116 applies a magnetic field modulated according to the data on magneto-optical disk 101.

A laser drive circuit 117 drives a semiconductor laser (not shown) in a pickup 102 to generate a laser beam of a predetermined intensity. Pickup 102 directs a laser beam of a predetermined intensity onto magneto-optical disk 101. Accordingly, a magnetic domain with a different direction of magnetization according to data is formed on magneto-optical disk 101, whereby data is recorded with the magnetic field modulated.

The reproduction operation of this recording and reproduction apparatus will be described with reference to FIG. 4. Data is reproduced by pickup 102 from magneto-optical disk 101 that is driven rotatably by a motor 116 and applied to a signal operation circuit 100. Signal operation circuit 100 applies an operation on each sensor output signal of pickup 102 to output separately a reproduced data signal RS, a tangential push pull signal TPP to detect the FCM of each segment, and a radial push pull signal RPP to reproduce the address data recorded by wobbling at the address field of the address segment.

Reproduced data signal RF has the frequency that allows demodulation extracted via a band pass filter (BPF) 103, and converted into a digital signal by an AD converter 104. The output of AD converter 104 is waveform-equalized by a waveform equalization circuit 105 to be applied to the well-known Viterbi decoder 106.

The output decoded at Viterbi decoder 106 is applied to a data demodulator 108. The digital modulation applied at the time of recording is digital-demodulated, and then applied to an error correction circuit 109. Error correction circuit 109 executes error correction using redundancy data such as the error correction code (ECC data) added at the time of recording.

The output of Viterbi decoder 106 is also applied to a header detection circuit 107. Header detection circuit 107 detects the position of the header field recorded in segment 1 to produce a header detection signal. This header detection signal is applied to data demodulator 108.

The TPP signal output from signal operation circuit 100 is applied to a PLL circuit 110. PLL circuit 110 generates data clock CLK according to a TPP signal which is a reproduced signal of the FCM of each segment. Data clock CLK generated at PLL circuit 110 is applied to the aforementioned AD converter 104, waveform equalization circuit 105, Viterbi decoder 106, header detection circuit 107 and data demodulator 108, as well as to address detection circuit 111 and data modulator 114. A signal corresponding to an FCM based on the TPP signal is provided from PLL circuit 110 to address detection circuit 111.

An RPP signal extracted from signal operation circuit 100 is applied to address detection circuit 111. Address detection circuit 111 detects a synchronizing signal included in the address data reproduced from the address segment to properly extract the address information of the relevant frame. The extracted information is provided to controller 112.

Controller 112 transfers control data among data demodulator 108, error correction circuit 109, error correction code addition circuit 113 and data modulator 114.

FIG. 5 is a schematic block diagram of the circuit configuration of the portion 10 related to error correction and modulation/demodulation enclosed by the broken line, which is actually realized as an LSI, in the recording and reproduction apparatus of FIG. 4.

The operation of LSI 10 in the write operation of the recording and reproduction apparatus will be described briefly with reference to FIG. 5. In a write mode, the user data to be recorded is applied to a DMA 11 from the host side via a host interface (I/F). The applied data is sequentially written into SDRAM 12 by DMA 11.

The data stored in SDRAM 12 is read out to an ECC/EDC/SCR•encoder/decoder 13. The user data is scrambled by the well known method, and redundancy data including codes for error correction and error detection (ECC data, EDC data) are added to be written back into SDRAM 12.

The data written back into SDRAM 12 is digital-modulated by a modulator/demodulator formatter/deformatter 14 and formatted into a predetermined data format suited for recording to be applied to magnetic head drive circuit 115 of FIG. 4 as write related data.

The operation of LSI 10 in the read operation of the recording and reproduction apparatus will be described briefly with reference to FIG. 5. In a read mode, the data reproduced from magneto-optical disk 101 is applied to waveform equalization and Viterbi decode circuit 15 to be subjected to the waveform equalization and Viterbi decoding process. The data subjected to waveform equalization and Viterbi decoding is digital-modulated by modulator/demodulator•formatter/deformatter 14 and deformatted into data of the above-described ECC layout block to be written into SDRAM 12.

The data stored in SDRAM 12 is read out to ECC/EDC/SCR•encoder/decoder 13 to be subjected to respective processes of error correction, error detection, and descramble. The processed data is written back to SDRAM 12.

The user data among the data written back into SDRAM 12 is read out via DMA 11 to be sent to the host side via a host I/F.

Controller 112 (FIG. 4) transmits/receives a control signal to/from DMA 11, SDRAM 12, ECC/EDC/SCR•encoder/decoder 13, modulator/demodulator•formatter/deformatter 14, waveform equalization and Viterbi decode circuit 15 via the MPU bus.

Figure 6:
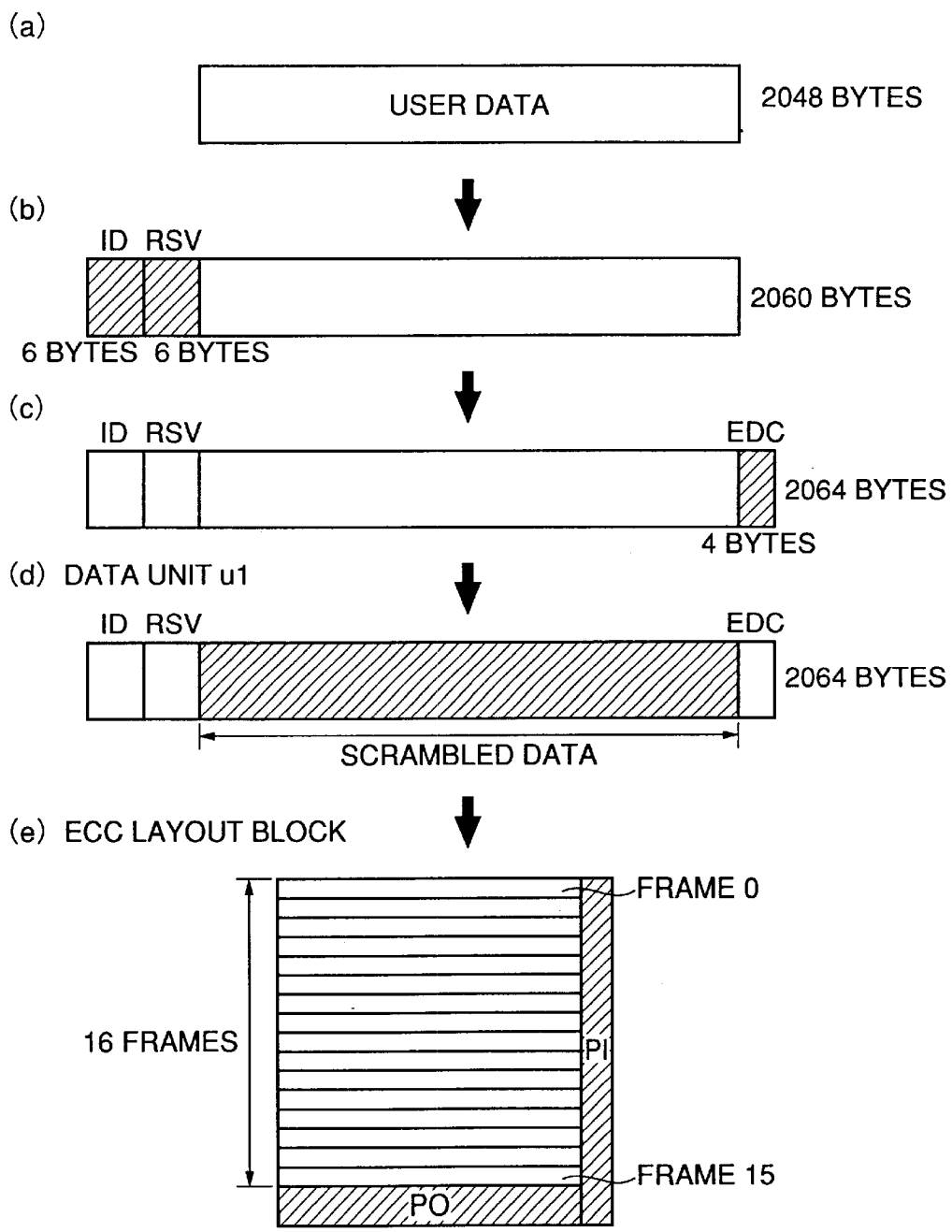
FIG. 6 is a diagram to describe the data processing flow in a write operation.

FIG. 6 is a diagram to describe the data processing flow in a write mode according to the LSI circuit configuration of FIG. 5.

The user data (2048 bytes) indicated at step (a) of FIG. 6 is transferred from the host side. As shown in step (b) of FIG. 6, a data ID field of 6 bytes and a reserved field RSV of 6 bytes are added to the user data.

As shown in step (c) of FIG. 6, an error detection code (EDC data) of 4 bytes is added. Then, the user data is subjected to scrambling, as shown in step (d) of FIG. 6. Data of this status is referred to as a data unit U1.

Following the scrambling, an ECC layout block is generated with sixteen frames (one frame is formed of 16 data units U1) as one unit, as shown in step (e) of FIG. 6.

FIG. 7 schematically shows an ECC layout block stored in the two dimensional memory region of SDRAM 12. Referring to FIG. 7, the data of the ECC layout block has a length of 182 bytes in the horizontal direction, formed of data of 172 bytes and a PI parity of 10 bytes, and 208 lines in the vertical direction, formed of data of 192 lines and a PO parity of 16 lines.

The PI parity and PO parity of the ECC data are operated with respect to the user data by a product coding method using the well-known Reed-Solomon code and added to the user data. The PI and PO parities are used in the error correction process in a read (reproduce) mode. In the read operation, data is fist stored in SDRAM 12. Data (182 bytes) in the horizontal direction (PI direction) is sequentially read out one line at a time into the ECC circuit from the data of the ECC layout block of one unit. An error correction process is applied for each line. The corrected data is written back into SDRAM 12. Then, data (208 bytes) in the vertical direction (PO direction) is sequentially read out one line at a time into the ECC circuit from SDRAM 12. An error code process is applied for each line. The corrected data is written back into SDRAM 12. The number of corrections in the vertical direction and horizontal direction is arbitrary.

Figure 8:
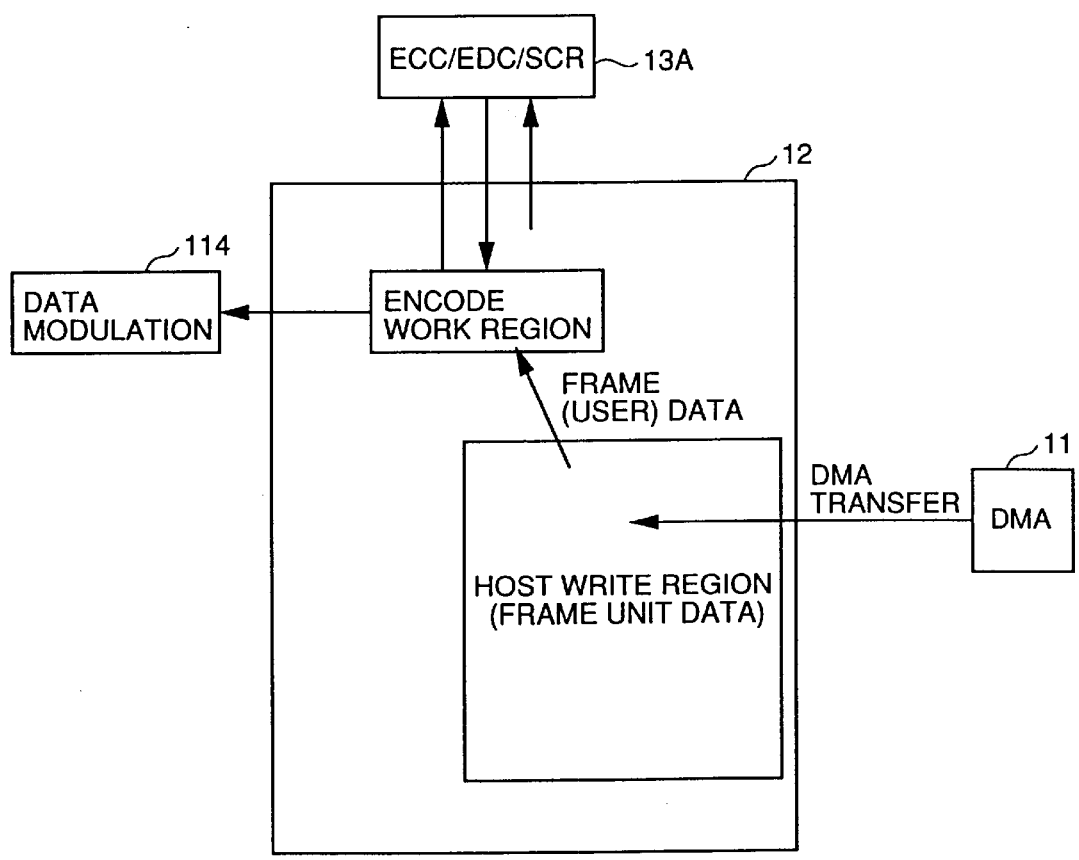
FIG. 8 shows a structure for a write operation according to an embodiment of the present invention.

The structure directed to a write operation according to the present embodiment will be described with reference to FIG. 8. The user data of the frame unit transferred from the host I/F is stored into the host write region of SDRAM 12 by DMA 11. The host write region is formed of a plurality of write cache regions. User data in the ECC block unit is stored in each write cache region.

The user data stored in the host write region is read into the encode work region to be subjected to a scramble process and ECC•EDC encode process by an ECC/EDC/SCR•encoder 13A included in ECC/EDC/SCR•encoder/decoder 13.

The data subjected to the scramble process and ECC•EDC encode process is written back into the encode work region. The encode work region is formed of two encode regions. Data in the ECC layout block unit is stored in each encode region.

The ECC layout block data stored in the encode region is data modulated to be recorded onto a disk.

Figure 9:
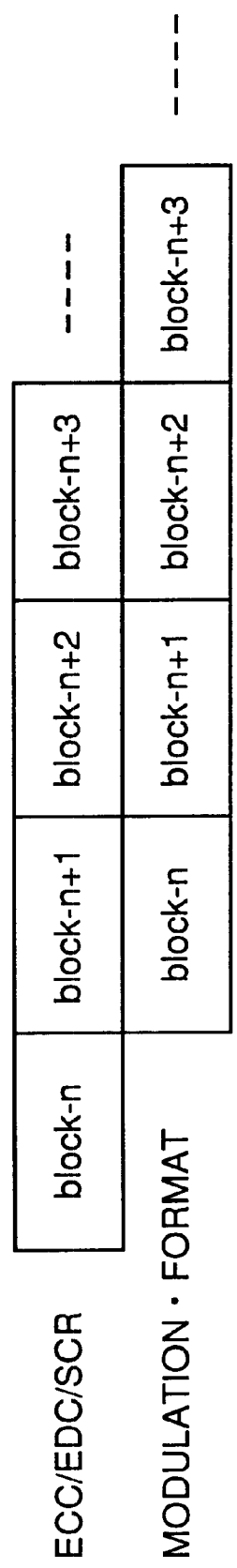
FIG. 9 shows a pipeline process according to the structure of FIG. 8.

A pipeline process according to the structure of FIG. 8 will be described with reference to FIG. 9. An ECC layout block ("block" in drawing) n generated as a result of the ECC•EDC encode process and scramble process (ECC/EDC/SCR) is subjected to a modulation process and a formatting process at the next stage to be written into a disk. In parallel to the modulation and formatting process of ECC layout block n, an ECC•EDC encode process and scramble process are applied on the next ECC layout block n+1.

At the next stage, ECC layout block n is recorded on a disk. The succeeding ECC layout block n+1 is subjected to a modulation and formatting process. At the same time, an ECC•EDC encode process and scramble process are applied on the next ECC layout block n+2. In a similar manner, the ECC•EDC encode process and scramble process→modulation/formatting →OUT process are continued in a pipelined manner.

Memory mapping according to an embodiment of the present invention will be described in comparison with conventional memory mapping.

Figure 10:
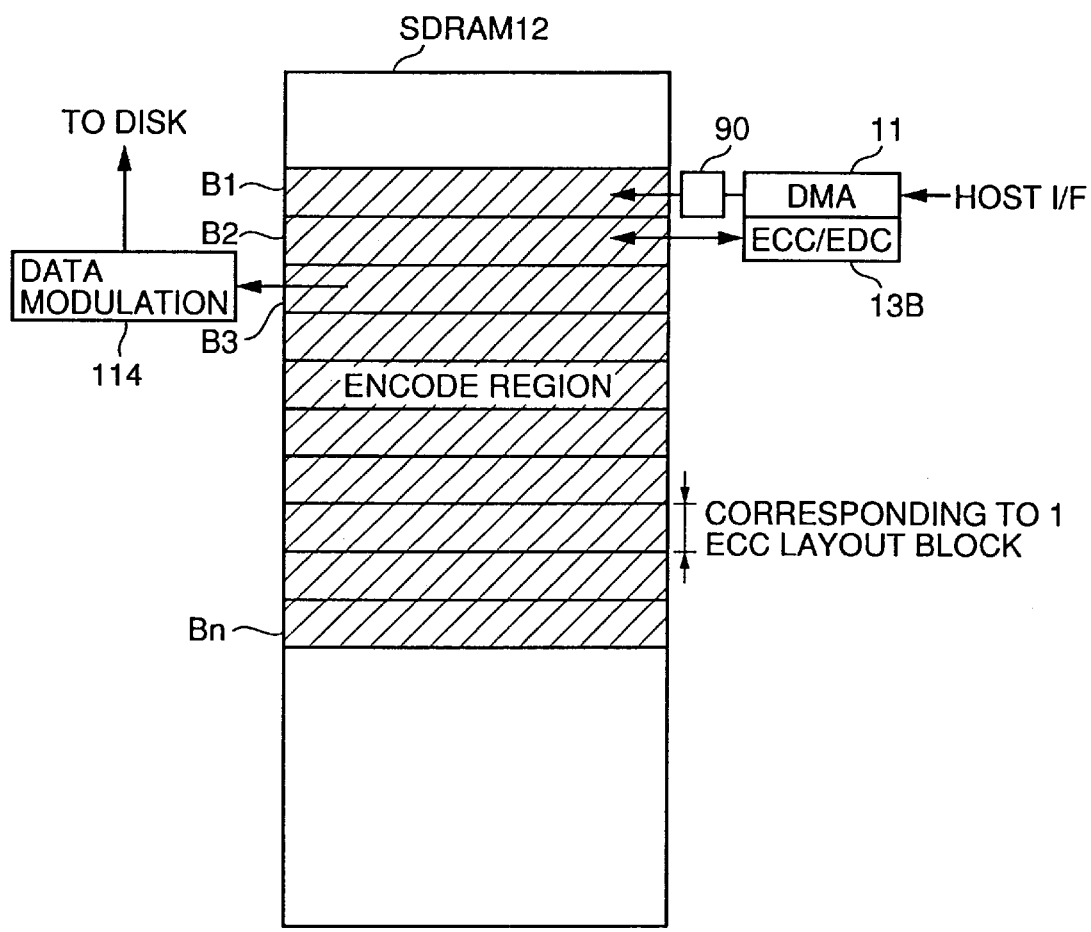
FIG. 10 is a diagram to describe memory mapping in a conventional write operation.

The conventional memory mapping for a write operation will be described with reference to FIG. 10. Conventionally, the user data transferred from the host I/F is sequentially written into the encode work region of SDRAM 12 by DMA 11.

The encode work region is formed of a plurality of encode regions B1, B2, . . . , Bn. Each encode region has a size required for data of an ECC layout block with added redundancy data to be written. User data is first stored at the positions of frames 0–15 shown in FIG. 7 for each encode region. In writing data into SDRAM 12, address conversion 90 is applied to convert the logic address into a physical address for all the user data.

When the user data transferred from the host is stored into encode region B1, a scramble process and ECC•EDC encode process (ECC/EDC 13B) are applied on the user data stored in encode region B2 of one block before. The data subjected to the scramble process and ECC•EDC encode process (ECC layout block data) is written back into the former encode region B2.

The data of a further one block before stored in encode region B3 that is already subjected to the scramble process and ECC•EDC encode process is data-modulated 114, and then recorded onto a magneto-optical disk.

Figure 11:
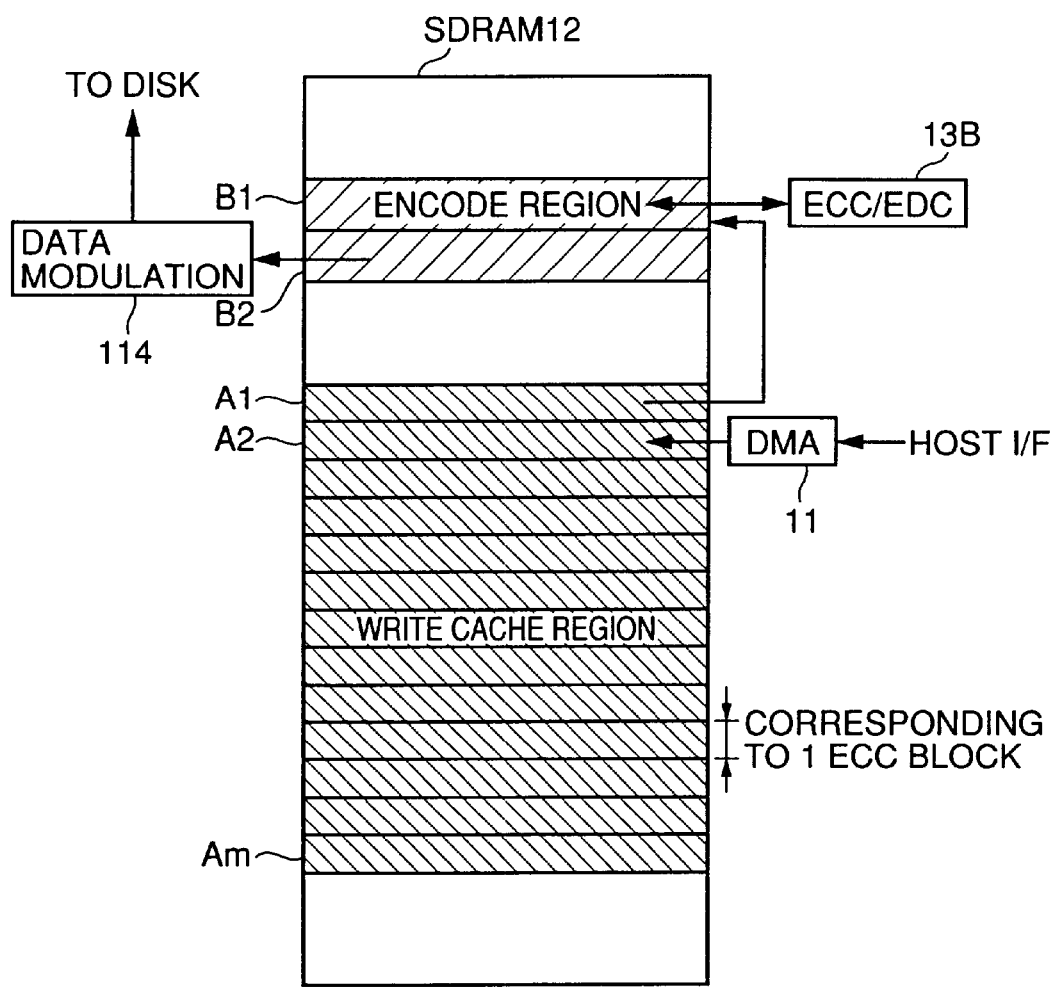
FIG. 11 is a diagram to describe memory mapping in a write operation according to an embodiment of the present invention.

Memory mapping in a write operation according to an embodiment of the present invention will be described with reference to FIG. 11. In the embodiment of the present invention, user data transferred from the host I/F is sequentially written into the host write region of SDRAM 12 by DMA 11.

The host write region is formed of a plurality of write cache regions A1, A2, ..., Am. Each write cache region has a size required for user data of 1 ECC block unit (that is, 16 frame units) to be written therein.

When the user data transferred from the host is stored in write cache region A2, the user data of one block before stored in write cache region Al is read into encode region B1 that is the encode work region to be subjected to a scramble process and ECC•EDC encode process (ECC/EDC 13B). The data (ECC layout block data) subjected to the scramble process and ECC•EDC encode process is written back into encode region B1.

The encode work region of the embodiment of the present invention is formed of an encode region B1 and an encode region B2. As described above, each encode region has a size required for an ECC layout block data added with redundancy data to be written.

When the ECC•EDC encode process is applied on the data in encode region B1, the data of one block before stored in encode region B2 that is already subjected to the scramble process and ECC•EDC encode process is subjected to data modulation 114. The data after modulation is recorded on a magneto-optical disk.

In the conventional case, memory mapping was effected so as to reliably acquire a region in the ECC layout block unit for every one ECC block unit. In the embodiment of the present invention, the encode region required for encoding is provided separately from the write cache region required for caching, wherein the encode region is used at the time of data processing. Therefore, only two encode regions are required. Thus, the region per ECC layout block can be reduced significantly.

For example, consider the case where data is stored in a page-by-page basis according to the page mode. It is assumed that one page is formed of 256 words (=16 words× 16=32 bytes×16).

Figure 12:
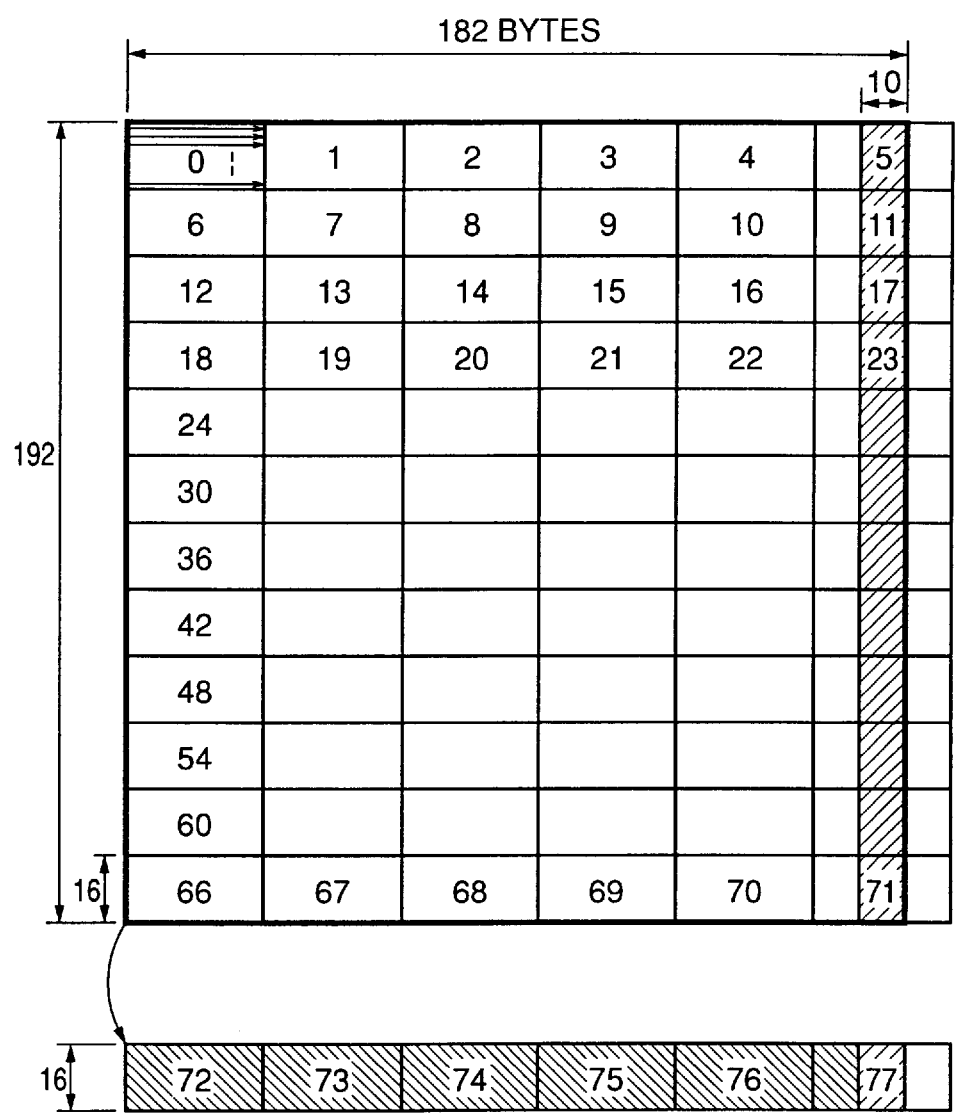
FIG. 12 shows the relationship between conventional memory mapping of FIG. 10 and a page.

First, the relationship between conventional memory mapping and page of FIG. 10 will be described with reference to FIG. 12. In conventional memory mapping, a region of the ECC layout block unit (182 bytes×208) must be provided for every 1 ECC block unit. For example, 78 pages are required for one ECC block if mapping as shown in FIG. 12 is effected.

The relationship between memory mapping and page according to the embodiment of the present invention of FIG. 11 will be described with reference to FIG. 13. In memory mapping according to the embodiment of the present invention, a region of 1024×16=16384 words is required for each one ECC block. Therefore, only 64 pages are required as shown in FIG. 13 for one ECC block.

Memory mapping according to the embodiment of the present invention is advantageous over conventional mapping in that the memory space to be used as well as the number of access times are reduced. There is also the advantage that power consumption can be reduced since the time required for access is shortened.

According to the embodiment of the present invention, the encode region required for encoding and the write cache region required for caching are provided separately so as to allow data to be read from the write cache region into the encode region for processing during the ECC•EDC encode process. Therefore, only encode regions for two ECC blocks are required.

Accordingly, the usage efficiency of SDRAM 12 is improved to improve the write cache efficiency for the same memory space. It is not necessary to directly place the data transferred from the host at the address corresponding to the physical address. Therefore, the degree of freedom of data reallocation on the write cache is improved.

According to the present invention, the encode region required for encoding and the write cache region required for caching are provided individually on the memory so as to allow data to be read from the write cache region to the encode region for processing during the ECC•EDC encode process.

Accordingly, the encode region is reduced significantly than the conventional case. The memory usage efficiency can be improved to allow improvement of the write cache efficiency with the same memory space. Since it is not necessary to directly place the data transferred from the host at the address according to the physical address, the degree of the freedom of data reallocation on the write cache can be improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A write cache circuit in a recording apparatus recording data transferred from a host on a recording medium with redundancy data for an error correction process added, said write cache circuit comprising:

a random access memory including a host write region and an encode work region, a write circuit writing said data transferred from said host into said host write region on the basis of an error correction block, a circuit transferring said data on the basis of the error correction block written in said host write region into said encode work region, and reading data out from said encode work region for a process of adding said redundancy data, or writing data obtained as a result of said process of adding redundancy data back into said encode work region, and a read circuit reading out data already added with said redundancy data from the data in said encode work region for recording on said recording medium.

2. The write cache circuit according to claim 1, wherein said host write region comprises a plurality of write regions, each of said plurality of write regions having a minimum size required to store said data on the basis of the error correction block.

3. The write cache circuit according to claim 1, wherein said encode work region comprises two encode regions, each of said two encode regions having a minimum size required to store said data on the basis of the error correction block and the corresponding redundancy data, data of one of said two encode regions becoming a subject of said process of adding redundancy data, and data of the other of said two encode regions being read out by said read circuit for recording on said recording medium.

4. The write cache circuit according to claim 2, wherein error correction codes in a horizontal direction and a vertical direction for an error correction process by a product code are added to said data on the basis of the error correction block in said process of adding redundancy data.

5. The write cache circuit according to claim 3, wherein error correction codes in a horizontal direction and a vertical direction for an error correction process by a product code are added to said data on the basis of the error correction block.

6. A recording apparatus recording data transferred from a host on a recording medium with redundancy data for an error correction process added, said recording apparatus comprising:

an encoder adding said redundancy data, a write cache circuit, and a record processing circuit modulating data added with said redundancy data for recording on said recording medium, wherein said write cache circuit comprises a random access memory including a host write region and an encode work region, a write circuit writing said data transferred from said host into said host write region on the basis of an error correction block, a circuit transferring said data on the basis of the error correction block written in said host write region to said encode work region, and providing data from said encode work region to said encoder, or writing data received from said encoder back into said encode work region, and a read circuit reading out data already added with said redundancy data from the data in said encode work region and providing the read data to said record processing circuit.

7. The recording apparatus according to claim 6, wherein said host write region comprises a plurality of write regions, each of said plurality of write regions having a minimum size required to store said data on the basis of the error correction block.

8. The recording apparatus according to claim 6, wherein said encode work region comprises two encode regions, each of said two encode regions having a minimum size required to store said data on the basis of the error correction block and the corresponding redundancy data, data of one of said two encode regions becoming a subject of a process by said encoder, and data of the other of said two encode regions becoming a subject of a process by said record processing circuit.

9. The recording apparatus according to claim 7, wherein error correction codes in a horizontal direction and a vertical direction for an error correction process by a product code are added to said data on the basis of the error correction block in said process of adding redundancy data.

10. The recording apparatus according to claim 8, wherein error correction codes in a horizontal direction and a vertical direction for an error correction process by a product code are added to said data on the basis of the error correction block in said process of adding redundancy data.

11. A write cache method of a recording apparatus including a random access memory having a host write region and an encode work region, and recording data transferred from a host on a recording medium with redundancy data for an error correction process added, said write cache method comprising the steps of:

writing said data transferred from said host into said host write region on the basis of an error correction block, transferring said data on the basis of the error correction block written in said host write region to said encode work region, and reading out data from said encode work region for a process of adding said redundancy data, or writing data obtained as a result of said process of adding redundancy data back into said encode work region, and reading out data already added with redundancy data from the data in said encode work region for recording on said recording medium.

12. The write cache method according to claim 11, wherein said host write region comprises a plurality of write regions, each of said plurality of write regions having a minimum size required to store said data on the basis of the error correction block.

13. The write cache method according to claim 11, wherein said encode work region comprises two encode regions, each of said two encode regions having a minimum size required to store said data on the basis of the error correction block and the corresponding redundancy data, data of one of said two encode regions becoming a subject of said process of adding redundancy data, and data of the other of said two encode regions being read out for recording on said recording medium.

14. The write cache method according to claim 12, wherein error correction codes in a horizontal direction and a vertical direction for an error correction process by a product code are added to said data on the basis of the error correction block in said process of adding redundancy data.

15. The write cache method according to claim 13, wherein error correction codes in a horizontal direction and a vertical direction for an error correction process by a product code are added to said data on the basis of the error correction block in said process of adding redundancy data.

* * * * *